United States Patent [19]

Adam

[11] Patent Number: 4,808,226

[45] Date of Patent: Feb. 28, 1989

[54] BEARINGS FABRICATED FROM RAPIDLY SOLIDIFIED POWDER AND METHOD

[75] Inventor: Colin M. Adam, Mt. Waverley, Australia

[73] Assignee: The United States of America as represented by the Secretary of the Air Force, Washington, D.C.

[21] Appl. No.: 124,805

[22] Filed: Nov. 24, 1987

[51] Int. Cl.⁴ .................................................. B22F 3/00
[52] U.S. Cl. ........................................ 75/246; 75/0.5 C; 419/23; 419/33; 419/48; 384/912
[58] Field of Search ............... 419/23, 33, 48; 75/246, 75/0.5 C; 384/912

[56] References Cited

U.S. PATENT DOCUMENTS

| | | | |
|---|---|---|---|
| 3,235,417 | 2/1966 | Roy et al. | 148/136 |
| 3,556,780 | 1/1971 | Holtz | 419/33 |
| 3,681,061 | 8/1972 | Fletcher | 75/171 |
| 3,827,863 | 8/1974 | Takahashi et al. | 29/182 |
| 3,834,004 | 9/1974 | Ayers | 29/420.5 |
| 3,982,905 | 9/1976 | Osawa et al. | 29/182.5 |
| 3,986,867 | 10/1976 | Masumoto et al. | 75/126 A |
| 4,011,108 | 3/1977 | Hellman et al. | 148/11.5 P |
| 4,116,684 | 9/1978 | Uchida et al. | 75/126 C |
| 4,204,887 | 5/1980 | Masumoto et al. | 148/31 |
| 4,253,874 | 3/1981 | Cundill | 419/33 |
| 4,274,876 | 6/1981 | Kodama et al. | 75/243 |
| 4,276,085 | 6/1981 | Wisell | 75/126 C |
| 4,343,750 | 8/1982 | Holiday et al. | 264/8 |
| 4,355,057 | 10/1982 | Slaughter | 427/216 |
| 4,519,839 | 5/1985 | Toyoaki et al. | 419/33 |
| 4,576,642 | 3/1986 | Holtz | 419/33 |
| 4,582,536 | 4/1986 | Rayhould | 419/33 |

Primary Examiner—Stephen J. Lechert, Jr.
Attorney, Agent, or Firm—William G. Auton; Donald J. Singer

[57] ABSTRACT

A process of fabricating steel stock for bearing components from highly alloyed steel powders supersaturated in carbon up to 0.5 weight percent in ferrite and up to 1.0 weight percent in austenite type combinations is disclosed. Rapid solidification of an atomized molten composition yields a metal powder with a diameter ranging between 75 and 105 microns. The metal powder is then compressed and heated to a low forging temperature between 1,600° and 1,800° F. to yield the steel stock.

4 Claims, 6 Drawing Sheets

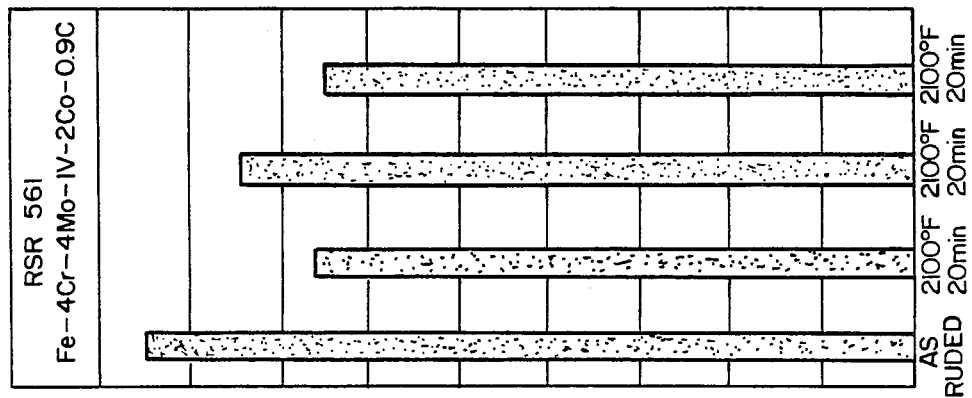
FIG.6A — RSR 556 Fe-4Cr-4Mo-1V-0.9C
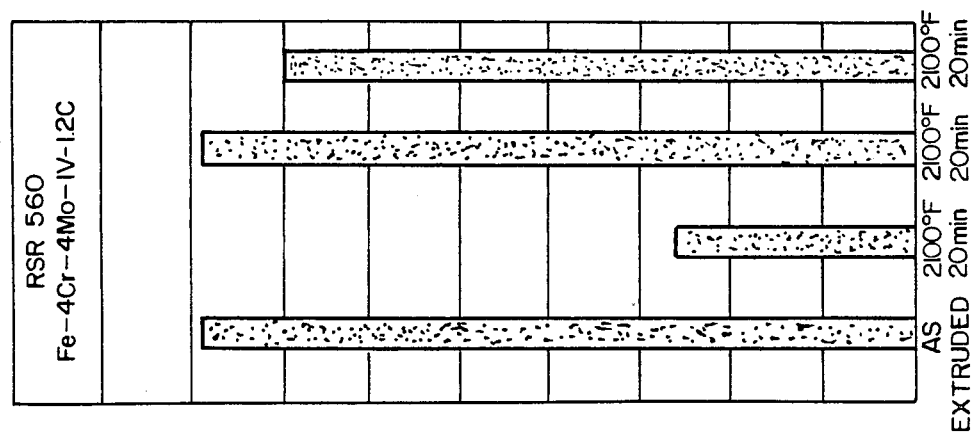
FIG.6B — RSR 560 Fe-4Cr-4Mo-1V-1.2C
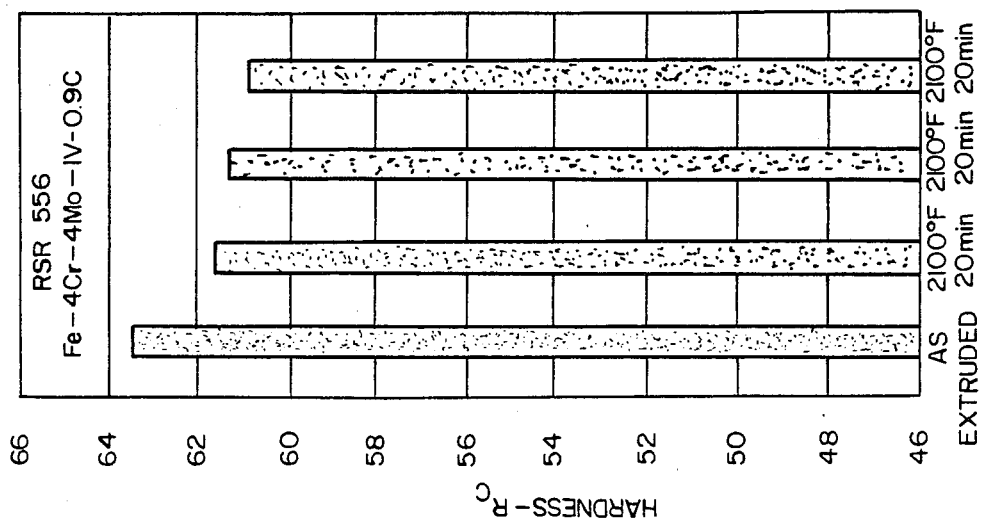
FIG.6C — RSR 561 Fe-4Cr-4Mo-1V-2Co-0.9C

BEARINGS FABRICATED FROM RAPIDLY SOLIDIFIED POWDER AND METHOD

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the manufacturing of steel objects from steel powders, and more specifically to bearings fabricated from highly alloyed steel powders supersaturated in carbon up to 0.5 weight percent in ferrite, and up to 1.0 weight percent in austentite type combinations, using a rapid solidification process.

Heretofore, bearings used for high performance gas turbine engines were manufactured from alloy steel ingots made by either the consumable electrode vacuum melt process (CEVM) or the vacuum induction melting vacuum arc refining process (VIM-VAR). Both these processes make extremely clean steel ingots of high quality without silicate inclusions, suitable for bearings and gears, but these ingots are slowly cooled and result in carbon segregation leading to large complex carbide particles in the starting materials from which the bearings are subsequently fabricated. These coarse complex carbides are detrimental to the operating lifetime of a bearing since they lead to corrosion problems associated with pitting, and a reduction in fatigue lifetime associated with premature crack nucleation at large carbide particles.

The present invention proposes to produce bearings with very high uniformity of structure, on a scale less than one micron, using a rapid solidification process to make rapidly solidified powder, and then to consolidate this powder by thermomechanical processing for bearing components. The task of fabricating bearings from rapidly solidified steel powders is alleviated, to some extent, by the systems disclosed in the following U.S. Patents, which are incorporated herein by reference:

U.S. Pat. No. 3,556,780 issued to F.C. Holtz, Jr;
U.S. Pat. No. 3,834,004 issued to M. D. Ayers;
U.S. Pat. No. 4,050,143 issued to C. Aslund;
U.S. Pat. No. 3,936,299 issued to G. Steven;
U.S. Pat. No. 4,078,873 issued to P. Holiday et al; and
U.S. Pat. No. 4,355,057 issued to E. R. Slaughter.

All of the above references are exemplary in the art and disclose applications of powder metallurgy which result in the manufacture of steel objects by compressing steel powder. The Holtz and Ayers references describe the fundamentals of powder metallurgy, including the process of atomization of melted alloys to produce alloy powders; and the consolidation of alloy powders into solid stock using pressures from 5–30 tons per square inch, and forging temperatures of up to 2,150 degrees F.

The Aslund and Steven references further disclose the production of tool steel articles, including dense metal tubes, from stock produced from metal powders. The disclosure of Holiday et al is useful for its description of the atomizing apparatus, which is used to produce metal powders. Finally, Slaughter discloses the formation of alloy powders using rapid solidification techniques.

While the above-referenced disclosures are helpful, the bearings currently used in high performance gas turbine engines have predominantly been manufactured from either the consumable electrode vacuum melt process, or the vacuum induction melting-vacuum arc refining process, which produces stock with coarse complex carbides which lead to corrosion problems and attenuate the operating lifetime of bearing elements. From the foregoing discussion, it is apparent that there currently exists the need to fabricate bearings from alloyed steel powders to improve the carbide phase characteristics. The present invention is intended to satisfy that need.

SUMMARY OF THE INVENTION

The present invention includes a process for producing steel alloy stock for the manufacture of bearings fabricated from highly alloyed steel powders supersaturated in carbon up to 0.5 weight percent in ferrite, and up to 1.0 weight percent in austentite type combinations. The process of the present invention includes a rapid solidification step, to fabricate steel alloy powders; and a thermomechanical processing step, to process the solidified powder into bearing components.

The rapid solidification step entails a number of substeps which produce a metastable austenitic metal powder from alloys including, in one embodiment, the use of modified M50 steel. The metallic powder is produced by atomization, which begins with the substeps of weighing and melting the selected alloy composition. In one embodiment, cobalt is added to the basic M50 composition. More specifically, once the amount of M50 alloy is weighed, the amount of added cobalt is between 1 and 5 percent of the weight of the M50 alloy. The resultant metal alloy will have an enhanced rolling contact fatigue lifetime.

After the selected alloy composition is melted it is poured into a rotary centrifugal atomization chamber, where it is broken into particles, and quenched by a steam of gas to extract a metal powder. This substep includes atomization of the molten alloy composition to produce a powder finer than 105 microns in diameter and specifically between 75 and 105 microns. Also note that helium gas is used to quench the atomized stream since helium gives a fast quenching rate.

The steel alloy powder produced by the rapid solidification step is sieved to retain particles between 75–105 microns in diameter, and contains: 4–10 percent tungsten, 1–5 percent cobalt, 1–6 percent chromium, 1–6 percent molybdenum, and 0.1–1 percent of vanadium and carbon to enhance the bearing rolling elements produced from these powders.

The thermomechanical processing step is divided into a number of substeps which collectively process the solidified powder into bearing components. In the first substep, the alloy powders are consolidated into a metal stock. This is accomplished as follows. First, the alloy powder is poured into cylinders, and consolidated by extrusion or hot vacum compaction to produce bar stock. Next, the bar stock is heated to forging temperatures to produce the bearing steel alloy. However, while the prior art forging temperatures range from 2,000°–2,500° F., the present invention departs from tradition and uses lower temperatures which range from 1,600° to 1,800° F. The advantages of the use of the lower temperature range include simplified processing and retention of fine carbide dispersion after processing.

The bar stock produced by the process described above is capable of being fabricated into a bearing rolling element without further heat treatment. This eliminates the need for a conventional high temperature austentization heat treatment of 2,000° to 2,500° F. for the duration of 0.1-2 hours as well as the need for subsequent quenching and tempering heat treatments.

It is an object of the present invention to provide a metallic alloy with enhanced rolling contract fatigue performance.

It is another object of the present invention to produce steel stock for bearing components from metastable austenic powder from alloys of M50 steel.

It is another object of this invention to produce steel stock for the fabrication of bearing elements with very high uniformity of structure, on a scale less than one micron.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIGS. 6A, 6B and 6C are charts depicting $R_c$ hardness vs. heat treatment for three bearing alloys.

DESCRIPTION OF THE PREFERRED EMBODIMENT

The present invention includes a process for producing steel alloy stock for manufacturing objects composed of metastable austenite and ferrite combinations from the rapid solidification of highly alloyed steel powders. These objects include bearing elements with prolonged rolling contact fatigue lifetimes.

Figure 1:
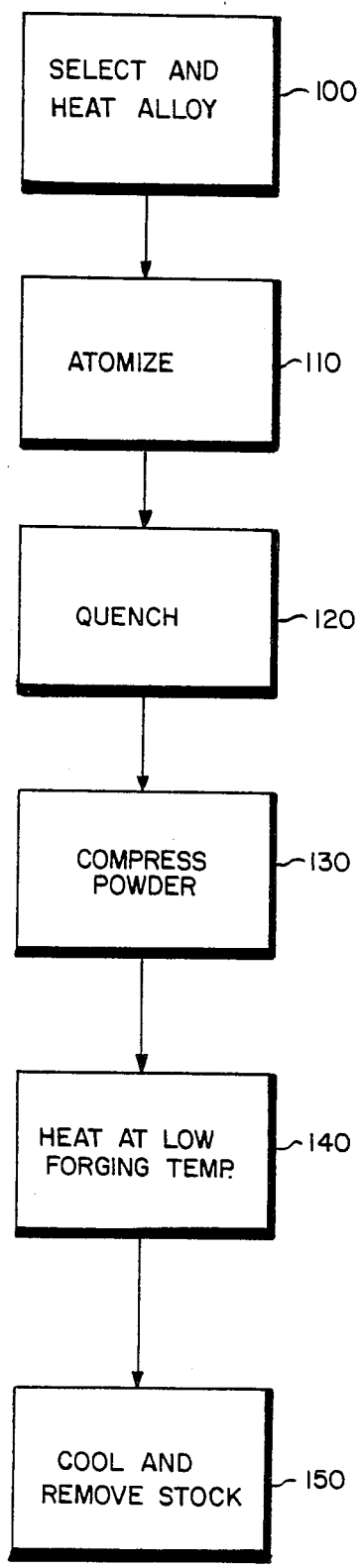
FIG. 1 is a block diagram of the manufacture process of the present invention.

The reader's attention is now directed towards FIG. 1, which is a block diagram of the manufacturing process of the present invention. The diagram of FIG. 1 should be viewed in the context of the description presented below, which distinguishes the present invention from prior art techniques.

The first step entails selecting and melting the alloy composition. This particular step is distinct regarding the selection of alloy compositions. More specifically, a number of modifications to the basic M50 alloy are proposed to produce enhanced rolling contact fatigue lifetimes and enhanced corrosion resistance. These new alloy compositions include the 400 and 500 series alloys presented below in Tables 1 and 2.

TABLE 1

ROLLING CONTACT FATIGUE LIFE DATA FOR 400 SERIES
RAPIDLY SOLIDIFIED CORROSION RESISTANT BEARING ALLOYS

| Alloy | Composition | $B_{10}$ Life Cycles to Failure | $B_{50}$ Life Cycles to Failure | Weibull Slope |
|---|---|---|---|---|
| 404 | Fe—14.7Cr—6mo—1V—1.15C | $2.47 \times 10^6$ | $8.66 \times 10^6$ | 1.50 |
| 405 | Fe—19Cr—2Mo—1V—1.25C | $4.7 \times 10^6$ | $11.36 \times 10^6$ | 2.14 |
| 406 | Fe—4Cr—8Mo—1V.0.81C | $4.9 \times 10^6$ | $13.1 \times 10^6$ | 1.91 |
| 407 | Fe—9Cr—8Mo—1V.0.93C | $3.7 \times 10^6$ | $10.9 \times 10^6$ | 1.70 |
| 409(−140)* | Fe—14.7Cr—4Mo—1V—1.15C | $5.6 \times 10^6$ | $7.0 \times 10^6$ | 8.8 |
| 409(−200)* | Fe—14.7Cr—4Mo—1V—1.15C | $3.0 \times 10^6$ | $8.8 \times 10^6$ | 1.75 |
| CEVM-M50 | Fe—4CR—4Mo—1V.0.85C | $5.29 \times 10^6$ | $11.48 \times 10^6$ | 2.43 |

*(−140) is the powder fraction passing through a No. 140 mesh standard U.S. sieve but retained on a No. 200 mesh sieve, and corresponds to a powder fraction with diameters in the range of 75 to 105 μm. (−200) is the fraction which passed through a No. 200 mesh sieve, and is finer than 75 μm in diameter.

| Alloy | Composition | Individual Lifetime Values |
|---|---|---|
| 404 | Fe—1.15C—14.7Cr—6Mo—1V | 3.64, 16.24, 10.94, 8.26, 1.5, 6.5, 13.86, 8.48, 11.80, 11.48 |
| 405 | Fe—1.25C—19Cr—2Mo—1V | 11.32, 8.43, 10.24, 5.21, 12.92, 10.67, 21.02, 8.40 |
| 406 | Fe—0.18C—4Cr—2Mo—1V | 7.97, 11.29, 12.4, 18.27, 6.18, .76, 29.2, 6.6, 4.3, 34.3, 24.4 |
| 407 | Fe—0.93C—9Cr—8Mo—1V | 12.66, 3.92, 13.88, 9.04, 16.9 |
| 409 | (75 to 105 m)Fe—1.15C—14.7Cr—4Mo—1V | 5.82, 6.08, 6.20, 6.44 6.58, 7.26, 7.30, 7.50, 8.16, 8.70 |
| 409 | (−75 m)Fe—1.15C—14.7Cr—4Mo—1V | 2.38, 3.88, 5.06, 7.12, 7.26, 11.16, 12.94, 13.12, 14.78, 17.02 |

*Rolling contact fatigue lives are given in millions of cycles to failure.

TABLE 2

ROLLING CONTACT FATIGUE LIFE DATA FOR 500 SERIES
RAPIDLY SOLIDIFIED M50 BEARING ALLOYS

| Alloy | Composition | $B_{10}$ Life Cycles to Failure 10 Pop. | $B_{50}$ Life Cycles to Failure of 50 Pop. | Weibull Slope |
|---|---|---|---|---|
| Baseline CEVMM50 | Fe—4Cr—4Mo—1V—0.85C | $2.7 \times 10^6$ | $5.9 \times 10^6$ | 2.4 |
| Baseline | Fe—4Cr—4Mo—1V—0.85C | $3.9 \times 10^6$ | $9.5 \times 10^6$ | 2.1 |

TABLE 2-continued
ROLLING CONTACT FATIGUE LIFE DATA FOR 500 SERIES RAPIDLY SOLIDIFIED M50 BEARING ALLOYS

| VIM-VARM50 | | | | |
|---|---|---|---|---|
| RSR 556 | Fe—4Cr—4Mo—1V.0.9C | $4.9 \times 10^6$ | $15.2 \times 10^6$ | 1.7 |
| RSR 557 | Fe—4Cr—4Mo—1V—4Co—1C | $10.5 \times 10^6$ | $28.4 \times 10^6$ | 1.9 |
| RSR 560 | Fe—4Cr—4Mo—1V—1.2C | $2.7 \times 10^6$ | $14.1 \times 10^6$ | 1.4 |
| RSR 561 | Fe—4Cr—4Mo—1V—2Co—0.9C | $19.2 \times 10^6$ | $36.6 \times 10^6$ | 2.93 |
| RSR 565 | Fe—4Cr—2Mo—1V—4Co—1C | — | — | — |
| RSR 566 | Fe—4Cr—5Mo—1V—6W—1Nb—1C | \multicolumn{3}{l}{Test suspended at $25 \times 10^6$ cycles; no failures.} |

| Alloy | Composition | Individual Lifetime Values |
|---|---|---|
| RSR 556 | Fe—4Cr—4Mo—1V—0.9C | 30.5(s), 15.2, 10.24, 36.0(s), 49.78(s), 11.5, 4.48 |
| RSR 557 | Fe—4Cr—4Mo—1V—4Co—0.9C | 32.7, 15.9, 9.22, 22.9, 36.7, 35.8(s), 63.0(s), 23.6 |
| RSR 560 | Fe—4Cr—4Mo—1V—1.2C | 4.8, 6.06, 12.6, 22.3, 39.14, 29.58, 12.06, 3.9, 6.7 |
| RSR 561 | Fe—4Cr—4Mo—1V—2Co—0.9C | 35.9, 120.0(s), 23.2, 39.2, 15.9, 28.88, 52.0, 30.02, 72.06(s), 47.37, 24.8 |
| RSR 566 | Fe—4Cr—5Mo—1V—6W—1Nb—1C | All tests exceeded $25 \times 10^6$ cycles without failure. |

*Rolling contact fatigue lives are given in millions of cycles to failure; values followed by (s) represent test suspensions without failure.

The 400 and 500 series alloys of Tables 1 and 2 are modified M50 alloy compositions. Of particular note are alloys 404 and 405 of Table 1. Alloy 404 has: 14.7 percent Cr, 6 percent Mo, 17 percent V, 1.15 percent C, and the balance of Fe. The added chromium (between 14 and 19 percent) produces substantially higher potential for corrosion resistance.

Tables 1 and 2 show typical rolling contact fatigue data for solidified alloys containing sufficient chromium for enhanced corrosion resistance. In this instance the particular feature of novel importance is the attainment of enhanced reliability by using a particular powder size fraction for bearing rolling element fabrication by the methods. This particular powder size and its implications will be discussed below in the description of the atomization step 110.

In addition to the alloy compounds of Tables 1 and 2, the present invention includes two other alloy compositions which may be selected in the selecting and melting step 100. The first of these alloy compositions is formed by adding between 1-5 percent of cobalt to the basic M50 alloy listed in Table 2. In other words, this alloy composition includes: 1-5 percent Co, 4 percent Cr, 4 percent Mo, 1 percent V, 0.85 percent C and the balance of Fe. The advantages of the addition of cobalt to the M50 alloy is discussed below.

The process of the present is characterized by the ability to produce new bearing alloy compositions with superior rolling contact fatigue performance over M50. Table 2 shows rolling contact fatigue data obtained from alloys of modified M50 alloy composition. This data indicates that cobalt additions to the basic M50 alloy composition enhance rolling contact fatigue lifetime, and we therefore claim that cobalt additions of 1 to 5 wt percent to M50 alloy compositions are examples of this invention, producing rolling contact fatigue lifetimes at least five times that of the conventional alloy M50.

The other new alloy composition of the present invention includes steel alloys containing 4-10 percent tungsten, 1-6 percent chromium, 1-6 percent molybdenum, and from 0.1 up to 1 percent of vanadium, niobium and carbon with the balance composed of Fe. These steel alloys also show superior rolling contact fatigue performance (RSR 566).

Once the alloy composition has been weighed and selected 100 it is melted in accordance with current forging and melting technology. For a summary of state-of-the-art melting technology, see the text entitled "Solidification Technology" edited by J. Burke, M. Flemings and A. Gorum, published by Brook Hill Publishing Company in 1974, the disclosure of which is incorporated by reference. Additionally, the Holtz reference teaches the production of metallic powder alloys.

After the alloy composition is melted, the molten mass is atomized to produce prealloy metallic powder. A state-of-the-art description of the atomization is provided in the Holtz patent. However, in the present invention the molten alloy is atomized and screened to two particle size fractions for the reasons discussed below.

Figure 2:
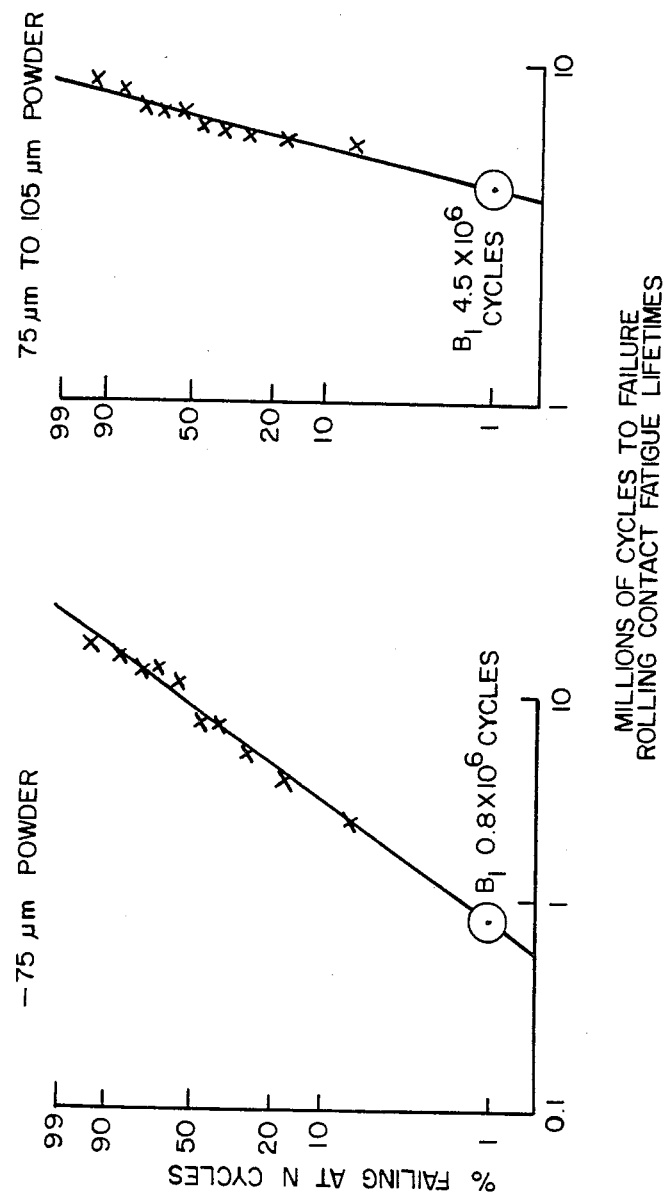
FIG. 2A and 2B are charts depicting Weibull distribution data for bearing alloys made from powders finer than 75 microns and from powders about 75–105 microns in diameter.

FIGS. 2A and 2B are charts depicting Weibull distribution data for bearing alloys fabricated from powder which is finer than 75 $\mu$m and powder which is between 75 pm and 105 $\mu$m in diameter. In this instance rolling contact fatigue tests indicate that at a particular number of cycles of stressing, eg. 4 million cycles, fewer than 1 percent of the samples tested, which were made from 75 to 105 $\mu$m diameter powder will have approximately 20 percent of the population as failures. The intrinsic difference between these two powder population groups is in the crystal structure of the powder.

Figure 3:
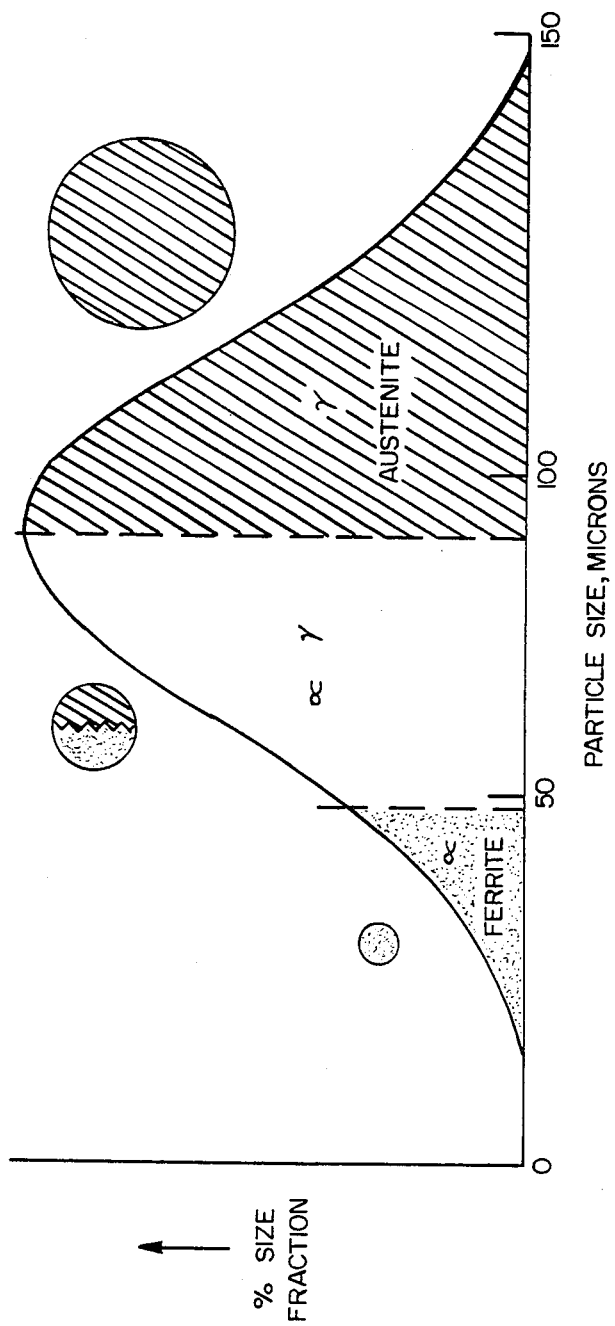
FIG. 3 is a chart of the austenite/ferrite distribution of a particular alloy as a function of the metal powder particle size.

FIG. 3 shows that the superior properties mentioned above were obtained from metastable austenitic powder when compared with the inferior population that is produced from the ferritic powder. The use of metastable austenitic powder is a novel feature of the rapid solidification process of this invention. Additionally, the achievement of high reliability and superior rolling contact fatigue properties results from the thermomechanical processing of this invention, including the use of metastable austenite at a lower temperature than is the current industrial practice. This is discussed in further detail below.

The atomization step produces alloyed steel powders when the atomized spray is quenched 120. In the quench step 120, the atomized spray is quenched with helium gas, which results in a faster quenching rate than that of some of the more conventional methods. The details of the quenching step are similar to that in the Holtz patent, in which molten spray is broken into particles and quenched by an inert gas (Argon), and the resultant metal powder is extracted from a water reservoir. In the present invention, helium gas is used instead of Argon.

Figure 4:
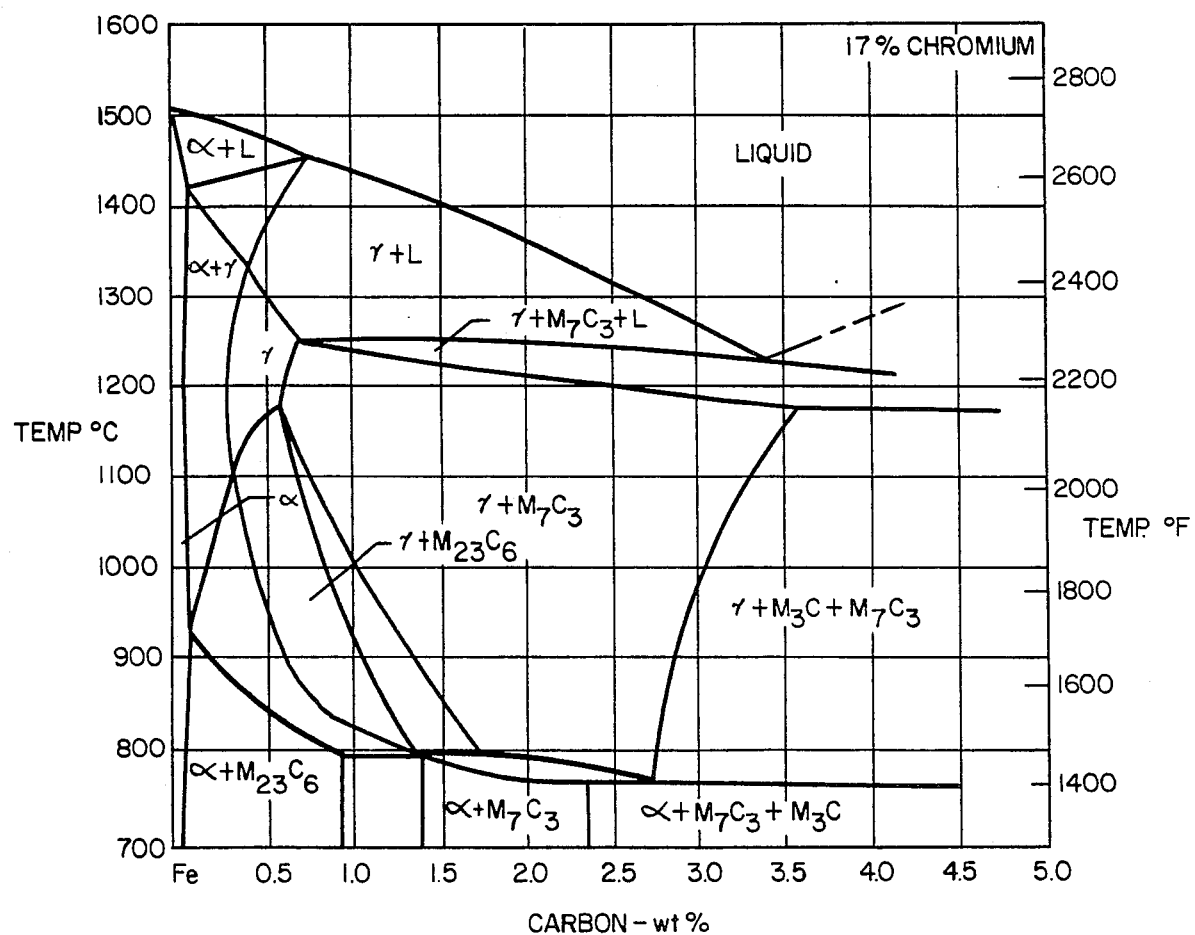
FIG. 4 is an equilibrium diagram for Fe-Cr-C alloys.
Figure 5:
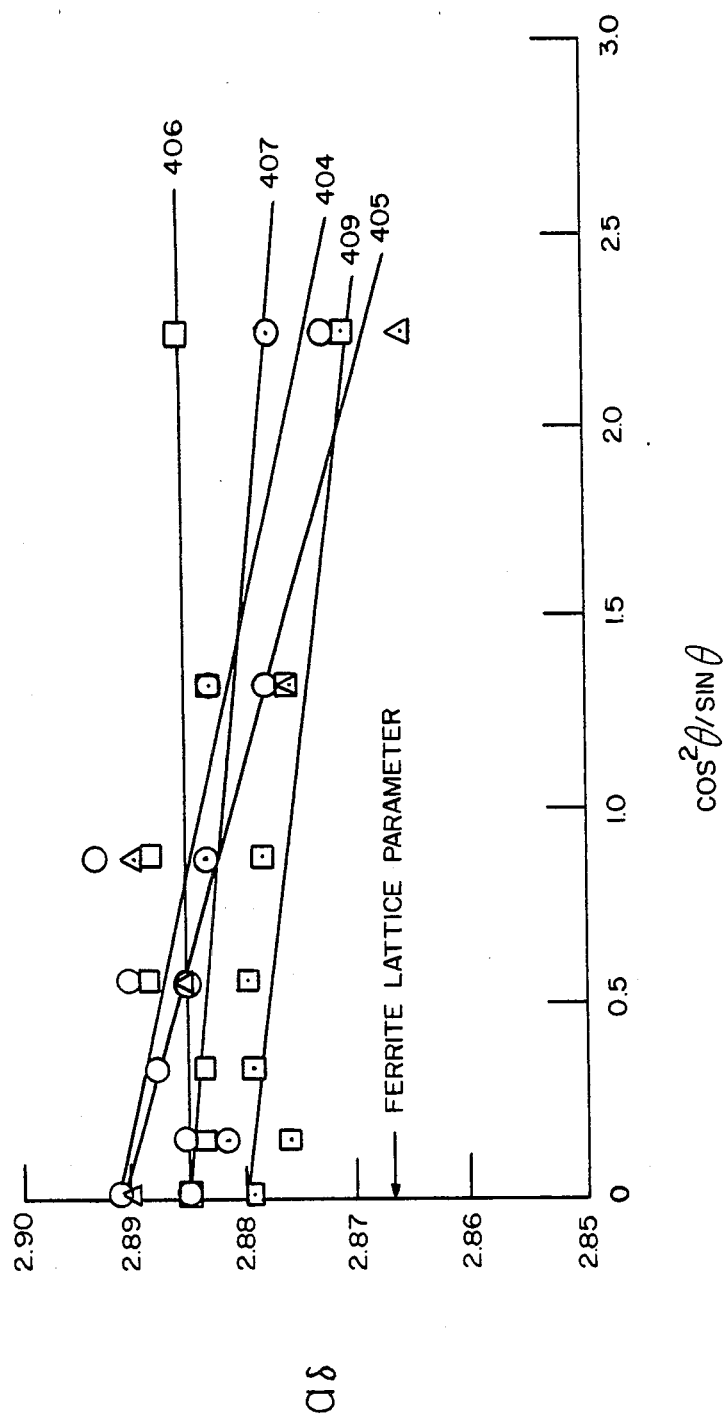
FIG. 5 is a chart depicting ferrite lattice parameter data.

The rapid solidification process described above produces a steel alloy powder which is screened to a paricle size less than about 75 microns in diameter. The reader's attention is now directed towards FIG. 4, which is an equilibrium diagram for Fe-Cr-C alloys. FIG. 4 shows that the maximum carbon content which can be accommodated in ferrite in high chromium steels is ≈0.1 wt percent and in austenite is ≈0.6 wt percent. In this invention we claim to have produced powder supersaturated in carbon up to ≈0.5 wt percent in ferrite, and up to 1 percent in austenite. FIG. 5 shows a number of determinations of lattice parameters of high chromium steels for which the lattice parameter would normally be 2.866–2.76A. The lattice parameter shown in FIG. 5, 2.88–2.89A, indicate substantial carbon supersaturation in ferrite. Similar data has been obtained and reported for austenite. An important aspect of this elemental supersaturation is that very fine and homogenous alloy structures can be produced in bearing steels by this process.

Once the steel alloy powder has been formed by the rapid solidification process and screened, the powder is poured into cylinders, and consolidated by extrusion or hot vacuum compaction. This consolidation step is similar to that described in the Holtz patent, and need not be redescribed here.

Next, the consolidated powder is heated at low forging temperatures 140. These low temperatures range between 1,600°–1,800° F. which is distinct from the 2,000°–2,500° f range normally used. The advantages of using the low forging temperature range are discussed below.

The ability to consolidate these powders and produce high Rc 60 - 64 hardness levels after thermomechanical processing, is an advantage of the present invention. This advantage is obtained by using much lower temperatures than are traditionally used for bearing steel heat treatment, i.e. 1600°–1800° F. rather than 2000°–2500° F. The principal advantage of this process includes simplified processing sequences, and the retention of fine carbide dispersions after such processing. In the present invention, it has been demonstrated that rapidly solidified powder placed in an evacuated container has been extruded at 1700° F. (925° C.) to produce bar stock of $\overline{Rc}$ hardness 60 - 64 suitable for bearing rolling element fabrication. This bar stock is capable of use as a bearing rolling element without further heat treatment, thus eliminating the need for high temperature austenitization heat treatments (2000°–2500° F. for 0.1–2 hours) and the subsequent quenching and tempering heat treatments (e.g. air cool, 1000° F. for 2 hours, liquid nitrogen exposure, 1000° F. for 2 hours). The attainment of superior or equivalent hardness by extruding these bearing alloys at 1700° F. is shown in FIGS. 6A, 6B and 6C. FIGS. 6A, 6B, and 6C are charts depicting Rc harness vs. heat treatment for these bearing alloys.

The present invention, as described above, has the ability to develop rolling contact properties at least as good as the currently used best gas-turbine engine bearing alloy, M50, in alloy compositions with substantially higher potential for corrosion resistance, e.g. 14 and 19 percent Cr steels of high carbon content. The process of the present invention also has the ability to produce new bearing alloy compositions with superior rolling contact fatigue performance over M50. Table 2 shows rolling contact fatigue data obtained from alloys of modified M50 alloy composition. This data indicates that cobalt additions to the basic M50 alloy composition enhance rolling contact fatigue lifetime, and we therefore claim that cobalt additions of 1 to 5 wt percent to M50 alloy compositions are examples of this invention, producing rolling contact fatigue lifetimes at least five times that of the conventional alloy M50.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process for producing austenite and ferrite steel alloy stock, said process comprising the steps of:
    selecting and melting an alloy composition to produce a molten alloy wherein said alloy composition is selected from a group consisting of about 9–14 percent Cr, 6 percent Mo, 1 percent V, 1.15 percent C and the balance Fe;
    atomizing said molten alloy into a spray;
    rapidly quenching said spray into said steel alloy powder using a stream of helium gas and then screening to a particle size ranging between 75 and 105 microns;
    pouring said steel alloy powder into cylinders;
    consolidating said steel alloy powder with pressures ranging between 5 and 30 tons per square inch; and
    extracting said steel alloy stock from said cylinders when it cools, said alloy stock having RC hardness levels ranging between RC 60 and RC 64.

2. The steel alloy stock produced by the process of claim 1.

3. A process for producing austenite and ferrite steel alloy stock, said process comprising the steps of:
    selecting and melting an alloy composition to produce a molten alloy, wherein said alloy composition is selected from a group consisting of about 4–10 percent tungsten, 1–6 percent chromium, 1–6 percent molybdenum, between 0.1–percent of vanadium, niobium, and carbon, and the balance Fe;
    atomizing said molten alloy into a spray;
    rapidly quenching said spray into said steel alloy powder using a stream of helium gas and then screening to a particle size ranging between 75 and 105 microns;
    pouring said steel alloy powder into cylinders;
    consolidating said steel alloy powder by extrusion at a temperature ranging between 1600F and 1800F; and
    extracting said steel alloy stock from said cylinders when it cools, said alloy stock having RC hardness levels ranging between RC 60 and RC 64.

4. The steel alloy stock produced by the process of claim 3.

* * * * *